(12) United States Patent
Alm

(10) Patent No.: US 9,574,524 B2
(45) Date of Patent: Feb. 21, 2017

(54) METHOD AND INTERNAL COMBUSTION ENGINE SYSTEM FOR KEEPING AN EXHAUST GAS AFTERTREATMENT SYSTEM WITHIN ITS WORKING TEMPERATURE RANGE

(75) Inventor: Christer Alm, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 301 days.

(21) Appl. No.: 14/115,136

(22) PCT Filed: May 2, 2011

(86) PCT No.: PCT/SE2011/000077
§ 371 (c)(1),
(2), (4) Date: Nov. 7, 2013

(87) PCT Pub. No.: WO2012/150879
PCT Pub. Date: Nov. 8, 2012

(65) Prior Publication Data
US 2014/0069085 A1 Mar. 13, 2014

(51) Int. Cl.
*F02M 31/083* (2006.01)
*F02M 25/07* (2006.01)
(Continued)

(52) U.S. Cl.
CPC ............ *F02M 25/074* (2013.01); *F01N 3/20* (2013.01); *F02D 9/04* (2013.01); *F02D 41/005* (2013.01);
(Continued)

(58) Field of Classification Search
CPC F02M 25/07; F02M 25/0707; F02M 25/0709; F02D 41/005; F02D 41/0052; F02D 41/0055; F02D 41/0077; F02D 41/08; F02D 41/1446; F02D 2400/11
See application file for complete search history.

(56) References Cited

U.S. PATENT DOCUMENTS

| 6,209,317 | B1 | 4/2001 | Hirota |
| 2004/0154585 | A1 | 8/2004 | Blumenstock et al. |
| 2010/0031939 | A1* | 2/2010 | Ono ................ F02D 41/08 123/568.22 |

FOREIGN PATENT DOCUMENTS

| EP | 0957254 A2 | 11/1999 |
| EP | 1277937 A2 | 1/2003 |

(Continued)

OTHER PUBLICATIONS

Machine translation of EP 1277937 A2, accessed on Jul. 8, 2015.*
(Continued)

*Primary Examiner* — Jonathan Matthias
(74) *Attorney, Agent, or Firm* — WRB-IP LLP

(57) ABSTRACT

A method and internal combustion engine system are provided for keeping an exhaust gas aftertreatment system within its working temperature range during an idle or motoring engine operation mode of an internal combustion engine. The method includes sensing the temperature of the gas at the gas intake side of the internal combustion engine and/or of the exhaust gas; determining whether or not the sensed temperature value is in a predetermined temperature interval or below a predetermined temperature threshold; determining whether the internal combustion engine is in idle or motoring engine operation mode; in case the internal combustion engine is determined to be in an idle or motoring engine operation mode, controlling the temperature of the gas at the gas intake side of the internal combustion engine to be within the predetermined temperature range or below the predetermined temperature threshold by recirculating exhaust gas through a connecting duct by controlling at least one valve.

21 Claims, 3 Drawing Sheets

(51) Int. Cl.

| | | |
|---|---|---|
| *F02D 9/04* | (2006.01) | |
| *F02D 41/16* | (2006.01) | |
| *F01N 3/20* | (2006.01) | |
| *F02D 41/02* | (2006.01) | |
| *F02D 41/00* | (2006.01) | |
| *F02B 29/04* | (2006.01) | |
| *F02D 41/14* | (2006.01) | |

(52) U.S. Cl.
CPC ....... *F02D 41/0055* (2013.01); *F02D 41/0245* (2013.01); *F02D 41/16* (2013.01); *F02M 26/05* (2016.02); *F02M 26/07* (2016.02); *F02M 26/10* (2016.02); *F02M 26/35* (2016.02); *F02M 26/47* (2016.02); *F02B 29/0406* (2013.01); *F02D 41/1447* (2013.01); *F02D 2200/0414* (2013.01); *F02D 2400/11* (2013.01); *Y02T 10/26* (2013.01); *Y02T 10/47* (2013.01); *Y10T 29/49233* (2015.01)

(56) References Cited

FOREIGN PATENT DOCUMENTS

| | | | |
|---|---|---|---|
| EP | 2131022 A1 | 12/2009 | |
| JP | H10068315 | 3/1998 | |
| JP | 2003027921 A | 1/2003 | |
| JP | 2004218500 | 8/2004 | |
| KR | 20090060760 A * | 6/2009 | ............ F02D 21/08 |
| SU | 1370283 A1 | 1/1988 | |
| WO | 03046354 A1 | 6/2003 | |
| WO | 2007032714 A1 | 3/2007 | |
| WO | 2007085944 A1 | 8/2007 | |

OTHER PUBLICATIONS

Machine translation of KR20090060760A, accessed on Jul. 14, 2016.*

International Search Report (Jan. 16, 2012) for corresponding International application No. PCT/SE2011/000077.

International Preliminary Report on Patentability (May 17, 2013) for corresponding International application No. PCT/SE2011/000077.

Supplementary European Search Report (Sep. 26, 2014) for corresponding European App. EP 11 86 4671.

Japanese Official Action (Feb. 13, 2015)(translation only) for corresponding Japanese App. 2014-509261.

* cited by examiner

METHOD AND INTERNAL COMBUSTION ENGINE SYSTEM FOR KEEPING AN EXHAUST GAS AFTERTREATMENT SYSTEM WITHIN ITS WORKING TEMPERATURE RANGE

BACKGROUND AND SUMMARY

The present invention relates to a method and an internal combustion engine system for keeping an exhaust gas aftertreatment system ("EATS") within its working temperature range during an idle or motoring engine operation mode of an internal combustion engine, wherein the internal combustion engine is connected to the exhaust gas aftertreatment system and comprises a gas intake side and an exhaust gas outlet side, wherein the exhaust gas outlet side of the internal combustion engine is connected with the exhaust gas aftertreatment system via an exhaust gas duct and with the gas intake side via a connecting duct, the connecting duct providing a gas recirculation of the exhaust gas to the gas intake side of the internal combustion engine, and at least one valve controlling the recirculation of the exhaust gas. The present invention further relates to a computer program product related to said method above.

The present invention further relates to a retrofitting kit and a retrofitting method for retrofitting a vehicle having an internal combustion engine without any exhaust gas recirculation (EGR) possibility, namely a so called "non-EGR engine", with a temperature control system for controlling the temperature in an exhaust gas aftertreatment system connected to the exhaust gas outlet side of the non-EGR engine, as well as a computer program product related to said method above.

At current and future emission levels for internal combustion engines in vehicles, particularly for heavy duty diesel engines, aftertreatment of the exhaust gas has increased in importance for both emissions and overall fuel consumption. Also drivability and dependability of the vehicles are affected by the different methods used to fulfill these emission standards.

One of the known methods is the use of a so called exhaust gas aftertreatment system usually in form of a catalyst or particle filter. These catalytic aftertreatment systems are operated within a suitable temperature range, for example 250° C.-450° C., which is easily maintained during normal driving conditions of a vehicle.

However, under certain operating conditions of an internal combustion engine the actual exhaust gas temperature is too low for said temperature range to be able to be maintained. These operating conditions are hereinafter referred to in the description and the claims as "idle or motoring engine operation modes" and are described more in detail in the following paragraphs.

The "idle engine operation condition" describes all engine operation modes, where the engine is running at idle speed. Idle speed is the rotational speed the engine runs on when the engine is decoupled from the drivetrain and the accelerator of the internal combustion engine is released. Usually, the rotational speed is measured in revolutions per minute, or rpm, of the crankshaft of the engine. At idle speed, the engine generates enough power to run reasonably smoothly and operate its ancillary equipment (water pump, alternator, and, if equipped, other accessories such as power steering), but usually not enough to perform heavy work, such as moving the vehicle. For vehicles such as trucks or cars, idle speed is customarily between 600 rpm and 1,000 rpm. Even if the accelerator is released, a certain amount of fuel is injected into the internal combustion engine in order to keep the engine running.

If the engine is operating a large number of accessories, particularly air conditioning, the idle speed must be raised to ensure that the engine generates enough power to run smoothly and operate the accessories. Therefore most engines have an automatic adjustment feature in the carburetor or fuel injection system that raises the idle speed when more power is required.

The "motoring engine operation mode" is defined as an engine operation mode, where the engine is running above a certain rotational speed (rpm), but no fuel is injected into the engine. One example of a motoring engine operation mode is when the engine is dragging, i.e. when a vehicle—which is normally driven by the engine—is coasting down a hill. During that mode the accelerator is also released, but the engine remains coupled to the drivetrain and the engine is kept running by the drive force of the gearbox main shaft.

During the above described idle or motoring engine operation modes, the engine is in principle pumping fresh air at ambient temperature to the exhaust system, whereby, disadvantageously, the exhaust gas aftertreatment system is "air cooled" in an uncontrolled (and unwanted) manner.

This in turn means that the temperature in the catalytic exhaust gas aftertreatment system drops rapidly below 250° C., so that an effective exhaust gas aftertreatment cannot be provided any more. It has therefore been suggested in the state of the art, to supply hydrocarbons (i.e. fuel) to an oxidation catalyst arranged in the exhaust gas stream for increasing the temperature of the exhaust gas, in order to maintain the temperature in the exhaust gas aftertreatment system. For that it is necessary to raise the average temperature of the oxidation catalyst during normal driving. This means that the hydrocarbons have to be injected into the oxidation catalyst while the temperature of the oxidation catalyst is higher than 250° C. to compensate for periods when the engine is in an idle or motoring engine operation mode. Therefore, this method causes an increase in fuel consumption and, consequently, an increase in fuel consumption costs.

Additionally, if the temperature of the exhaust gas stream is too low, more hydrocarbons (i.e. fuel) are needed in order to maintain the temperature in the exhaust gas aftertreatment system. Increased emission control requirements have therefore often resulted in a loss of efficiency of the internal combustion engine. It is therefore important to provide methods which allow effective exhaust emission control without adversely affecting the efficiency of the engine and the overall fuel consumption of the vehicle.

Beside the use of exhaust gas aftertreatment systems, a further possibility to reduce the emission of the combustion engine, particularly the quantity of nitrogen oxide in the exhaust gases, is a recirculation of exhaust gases, so-called EGR (Exhaust Gas Recirculation). Thereby, a part of the total exhaust gas flow of the internal combustion engine is recirculated. Internal combustion engines equipped with such EGR systems are also called "EGR engines". The recirculated sub-flow of exhaust gas is cooled before fed into the gas intake side of the EGR engine, where it is mixed with incoming air before the mixture is introduced into the cylinders of the EGR engine. Cooling of the recirculated exhaust gas is a prerequisite for the EGR engines as recirculating hot exhaust gas would increase the temperature of the gas at the gas intake side of the EGR engine to a level which could damage the EGR engine. Moreover, recirculation of exhaust gas amounts in the range of 15-30% of the total mass flow through the EGR engine is required for yielding a sufficient NOx reduction.

In WO2007/032714, it has been suggested to use in an EGR engine, i.e. in an internal combustion engine system equipped with an EGR-system, the recirculated exhaust gas stream to maintain the temperature in the exhaust gas aftertreatment system. Since, as described above, maintaining the temperature is mainly a problem occurring during idle or motoring engine operation modes, it has been suggested to first detect that neither the braking system nor the throttle control mechanism of the vehicle is activated and that the vehicle is being driven at a speed in excess of a predetermined speed limit. Provided such conditions are detected, in the known system the exhaust gas flow through the EGR recirculation duct is then regulated with the help of an EGR valve arranged in the EGR recirculation duct in such a way that the main exhaust gas flow to the exhaust gas aftertreatment system is reduced to a level which is substantially less than 50% of said main exhaust gas flow to the exhaust aftertreatment system when the EGR valve in the EGR recirculation duct is closed. Due to the significant reduction of exhaust gas streaming through the exhaust gas aftertreatment system during these motoring engine operation modes, heat losses in the exhaust aftertreatment system are prevented.

Disadvantageously, the described method cannot be used for "normal" internal combustion engines having no exhaust gas recirculation means, i.e. so called "non-EGR" engines. These engines are widely used for vehicles having emission levels less than required for instance by the EURO 5 standard. A further drawback is that EGR systems comprise a plurality of elements, e.g. valves, sensors, exhaust gas cooler etc. which control the operation of the EGR engine and the amount of recirculated exhaust gas. These control systems are rather complex in their structure and operation already without such further control mechanism described in WO2007/032714. The implementation of such an additional control mechanism would increase the malfunction probability of the complete system of an EGR engine and also the overall cost of said system.

It is desirable to provide a simple and cost-effective temperature control method and system for use with a non-EGR engine which provides a possibility to keep the exhaust gas aftertreatment system within its working temperature range without increasing the fuel consumption and deteriorating the engine's efficiency.

The present invention, according to an aspect thereof, is based on the idea to connect an exhaust gas outlet side of a non-EGR engine with a gas intake side of the engine by means of a connection duct for recirculating exhaust gas from the exhaust gas outlet side of the engine to the gas intake side of the engine only during idle or motoring engine operation modes, and to control the recirculation of the exhaust gas only in dependence of a temperature of the gas sensed at the gas intake side of the engine and/or of the exhaust gas during idle or motoring engine operation modes of the engine. The advantage of this solution is that the internal combustion engine does not only pump fresh air at ambient temperature to the exhaust gas aftertreatment system, but a mixture of air and recirculated hot exhaust gas. Consequently, the unwanted forced cooling effect due to the fresh air in the exhaust gas mixture entering the exhaust gas aftertreatment system is considerably reduced and the exhaust gas aftertreatment system is kept within its working temperature range during the periods wherein the internal combustion engine is in an idle or motoring engine operation mode.

In contrast to the design and operation of known EGR engines, in the present invention the connection duct provides a recirculation of exhaust gases during idle or motoring engine operation modes only. Of course, due to the design of the inventive internal combustion engine system, one could think of recirculating a certain amount of exhaust gas even during "normal" engine operation modes of said engine, i.e. during engine operation modes other than idle or motoring engine operation modes, but this kind of recirculation is not sufficiently controlled for qualifying as emission control by means of an EGR engine.

As soon as the accelerator of the vehicle (for instance the gas pedal) in the present invention is activated, the recirculation of exhaust gases of the non-EGR engine is terminated, that means in particularly that the connection duct is closed so that exhaust gas cannot be recirculated anymore. This in turn means that a NOx reduction due to EGR—as provided with EGR engines—is not intended with the present invention and may only occur accidentally. Further, a sophisticated cooling and controlling of the amount of recirculated exhaust gas, which is necessary for the NOx reduction reactions taking place in EGR engines during normal engine operation modes, is not possible with the present invention.

NOx reduction can only be performed at relatively low temperatures. The higher the combustion temperature is the higher is the NOx amount. The recirculation of exhaust gas reduces the oxygen amount which in turn decreases the combustion temperature. However, recirculation of uncooled exhaust gas (as used in the present invention) increases the temperature in the engine and therefore contradicts the desired NOx reduction process used in EGR engines. Consequently, this has to be avoided for the known EGR engines. Additionally, in the present invention exhaust gas is recirculated only during idle or motoring engine operation modes and not during "normal" engine operation modes, i.e. during engine operation modes other than idle or motoring engine operation modes, so that a NOx reduction cannot be achieved.

As mentioned above, in the present invention, exhaust gas recirculation is performed solely during idle or motoring engine operation modes. This in turn means that neither a cooler in the connection duct nor a sophisticated control of the exhaust gas recirculation is required. Consequently, the recirculated exhaust gas is not cooled as required for EGR engines, but simply recirculated "as it is". In one of the simplest embodiments of an aspect of the invention, the connection duct can be equipped with a simple on/off valve which opens the connecting duct during idle or motoring engine operation modes and closes in all other engine operation modes. For not damaging the internal combustion engine due to too high temperatures, the temperature of the gas at the gas intake side of the combustion engine and/or of the exhaust gas is sensed, and in case the sensed gas temperature exceeds a predetermined temperature threshold, the connection duct is closed, even if the combustion engine is still running in idle or motoring engine operation mode.

According to a further preferred embodiment, the exhaust gas duct is additionally equipped with a pressure control valve, which is controlled to at least partly close if the engine is in an idle or motoring engine operation mode. In this embodiment, the pressure control valve has at least two functions:

i. It reduces the total amount of exhaust gas flowing into the exhaust gas aftertreatment system, whereby an inflow of "cooling" exhaust gas into the exhaust gas aftertreatment is reduced, and ii. The pressure increase generated upstream of the pressure control valve by at least partly closing the valve propels the recirculation of the exhaust gas and preferably determines the amount of the exhaust gas that is supposed to be recirculated to the gas inlet side of the combustion engine.

According to a further preferred embodiment, in order to measure the gas temperature use is made of a temperature sensor which can be arranged for instance at gas intake side of the engine for sensing the gas temperature at the intake manifold of the engine and for controlling the recirculation of the exhaust gas.

As indicated above, keeping the aftertreatment system within its working temperature range during idle or motoring engine operation modes is achieved by two main concepts or, in a further development, by the combination of them:

i. Due to the recirculation of the uncooled exhaust gas, the operating temperature of the engine and thereby the overall temperature of the exhaust gas is increased, whereby the—unwanted—air cooling effect of the exhaust gas aftertreatment system during idle or motoring engine operation modes of the engine is reduced.

ii. Due to the at least partly closed pressure control valve arranged in the exhaust gas duct, the amount of exhaust gas flowing through the aftertreatment system during idle or motoring engine operation modes of the engine is reduced and the amount of recirculated exhaust gas to the engine may be controlled, which in turn also reduces the—unwanted—air cooling effect of the aftertreatment system during idle or motoring engine operation modes of the engine.

In contrast to known EGR engines, the inventive method and system can also be used for retrofitting existing non-EGR engines, since it does not influence the "normal" operation of the engine. This can be done by simply connecting the exhaust gas duct with an induction duct arranged at the gas intake side of the internal combustion engine by a connecting duct and arranging a gas recirculation valve, preferably in form of an on/off valve, in the connecting duct and, preferably, also arranging a pressure control valve in the exhaust gas duct. Vehicles that are equipped with non-EGR engines and that are capable of being retrofitted with a system according to an aspect of the invention usually comprise already a temperature sensor and a controller for controlling valves in dependence of the gas temperature and the engine operation mode which can be directly used for the inventive method and system.

It should be noted that since uncooled exhaust gas is fed to the gas intake side of the engine, the temperature of the gas at the gas intake side of the engine and consequently the temperature inside the internal combustion engine also increases. In order to not damage the engine, supply of uncooled exhaust gas is controlled in dependence on the sensed temperature of the gas at the gas intake side of the internal combustion engine and/or of the exhaust gas. As soon as the temperature of the gas at the gas intake side and/or the exhaust gas exceeds a certain predetermined maximum temperature, supply of the exhaust gas is stopped or at least reduced until the sensed temperature of the gas at the gas intake side and/or the exhaust gas is again below the predetermined maximum temperature. This reduction or stop of the flow of recirculated exhaust gas may be achieved in that (i) the pressure control valve is opened completely or at least more than before the temperature of the gas at the intake side and/or the exhaust gas has reached its maximum temperature and/or (ii) the gas recirculation valve is at least partly closed or completely closed for certain time periods or time intervals, even if the engine is still in the idle or motoring engine operation mode. This in turn means that in such specific situations—where, due to the temperature of the hot recirculated exhaust gas, the actual temperature of the engine increases and gradually approaches, or even starts to exceed, the allowable maximum temperature of the engine—more of the exhaust gas or, in the extreme case, all of the exhaust gas will be forwarded to the EATS, which in turn may temporarily cool down the EATS to lower temperatures—in the worst case even to a temperature below its working temperature range. However, since the temperature of the internal combustion engine is relatively hot compared with the working temperature range of the EATS even in these specific situations, also the exhaust gas of the engine is expected to remain sufficiently hot. Consequently, even in situations where the recirculation of the exhaust gas has to be temporarily stopped or reduced during idle or motoring engine operation modes, an excessive cooling down of the EATS is rather unlikely to happen. As soon as the temperature of the internal combustion engine returns to its predetermined working temperature range, and provided the engine is still in the idle or motoring engine operation mode, the process of recirculating exhaust gas is restored.

As mentioned above, the recirculated exhaust gas flow is controlled by an appropriate control of the at least one valve, preferably the gas recirculation valve and the pressure control valve in dependence on the sensed temperature. Preferably, the gas recirculation valve may remain open during idle or motoring engine operation modes and the amount of exhaust gas recirculation and thereby the temperature of the gas at the gas intake side of the engine and/or of the exhaust gas may be controlled by the opening or closing degree of the pressure control valve. This type of feed back control of a valve or flow is often called "closed loop control".

According to a preferred embodiment of an aspect of the invention, the gas recirculation valve is a simple on/off valve, which is either open or closed. The advantage is that a simple on/off valve is easy to control, cheap in use, and robust. Thereby the malfunction probability of the system is decreased.

Additionally, since the amount of exhaust gas flow recirculated to the engine does not need to be controlled as in normal EGR systems, a simple on/off valve that is normally closed is sufficient.

However, it goes without saying that, instead of a simple on-off valve, also a controllable valve could be used, the opening of which is continuously adjustable between completely closed and completely open.

According to a further preferred embodiment, the predetermined maximum temperature of the intake manifold at the gas intake side of the engine is approximately between 100° Celsius and 150° Celsius, particularly approximately between 110° Celsius and 130° Celsius, and preferably approximately 120° Celsius. Thereby, it is ensured that the internal combustion engine is not damaged.

According to a further preferred embodiment of an aspect of the invention, the pressure control valve arranged at the exhaust gas duct is adapted to reduce the gas flow to the exhaust gas aftertreatment system by circa 20% to 70%, preferably circa 30% to 60%, and most preferred circa 40% to 50%. Due to this reduction of total gas flow through the aftertreatment system, the "air cooling" effect of the aftertreatment system is reduced.

How much the gas flow to the exhaust gas aftertreatment system is reduced is preferably dependent on the engine speed and the sensed gas temperature at the intake manifold at the gas intake side of the engine and/or the exhaust gas. In general, the aim is to maximize the exhaust gas flow recirculated to the engine without exceeding the maximum temperature of approximately 120° C. at the gas intake side of the engine. Then, the flow to the exhaust gas aftertreatment system is minimized and the exhaust gas temperature is maximized. To do this, the above described "closed loop control" is used, preferably in form of software, to control the amount of recirculated exhaust gas by means of the pressure control valve in such a way that the gas at the gas intake side of the internal combustion engine reaches—but does not exceed—the permitted maximum temperature (here: for instance approximately 120° C.).

Preferably, the gas recirculation valve is closed as soon as an accelerator of the vehicle (for instance the gas pedal) is activated, and it is opened as soon as the accelerator is released. The control of the gas recirculation valve in dependence of the activation of the accelerator is a simple and effective control mechanism covering both the idle engine operation mode and the motoring engine operation mode. Preferably, at low idle speeds, e.g. around 600 rpm, and no accelerator demand, in addition to the recirculated exhaust gas, fuel is injected into the combustion engine for keeping the engine running.

According to a further aspect of the present invention, vehicles having non-EGR engines can be easily retrofitted with the inventive system for maintaining the temperature in the exhaust gas aftertreatment system. Thereby, an already existing exhaust gas aftertreatment system or a retrofitted exhaust gas aftertreatment system can be used. For retrofitting the non-EGR engine a retrofitting kit can be provided which may comprise a system for keeping the exhaust gas aftertreatment system within its working temperature range, comprising at least a connection duct for the recirculation of the exhaust gas which can be connected to the exhaust gas outlet side of the internal combustion engine (for instance to an exhaust gas duct arranged at the exhaust gas outlet side of the engine) and the gas intake side of the engine (for instance an induction duct arranged at the gas intake side of the engine), wherein a gas recirculation valve is arranged at the connection duct, and a controller for controlling the valve in the above described manner. Further, the controller can also be in form of a computer program which is intended to run on a vehicle's on-board computer.

Additionally, a pressure control valve may be provided for being arranged at the exhaust gas outlet side of the engine (for instance at the exhaust gas duct arranged at the exhaust gas outlet side of the engine). Further, a controller may be provided which is adapted to control the gas recirculation valve to open and the pressure control valve to at least partly close in such a way that—if the combustion engine is running in either an idle or the motoring engine operation mode—the temperature of the gas at the intake side of the engine and/or of the exhaust gas is kept or maintained within a predetermined temperature range.

In case the vehicle is not equipped with a temperature sensor, the retrofitting kit may also comprise a temperature sensor for sensing the temperature of the gas at the gas intake side of the engine and/or of the exhaust gas.

According to a further embodiment of an aspect of the invention, the controller of the retrofitting kit can be an already existing central processing unit (CPU) or electronic control unit (ECU) in the vehicle, particularly an onboard computer which is programmable to control the valves according to the above described way. A "CPU" is the portion of a computer system that carries out the instructions of a computer program. Particularly, in automotive electronics the term "ECU" is used as a generic term for any embedded system that controls one or more of the electrical systems or subsystems in a vehicle.

According to a further aspect of the invention, a computer program product is provided, which comprises a software code to be implemented on a computer, preferably on an on-board computer of the vehicle, so that the computer is adapted to perform the above described method steps. Preferably, the computer program product can be part of the retrofitting kit.

Further advantages and preferred embodiments are defined by the attached claims, the description and the Figures.

BRIEF DESCRIPTION OF THE DRAWINGS

In the following preferred embodiments of the system according to the invention will be discussed with the help of the attached Figures. The description of the Figures is considered as simplification of the principles of the invention and is not intended to limit the scope of the claims.

The Figures show.

In the following same elements or similarly functioning elements are indicated with the same reference numerals.

DETAILED DESCRIPTION

Figure 1:
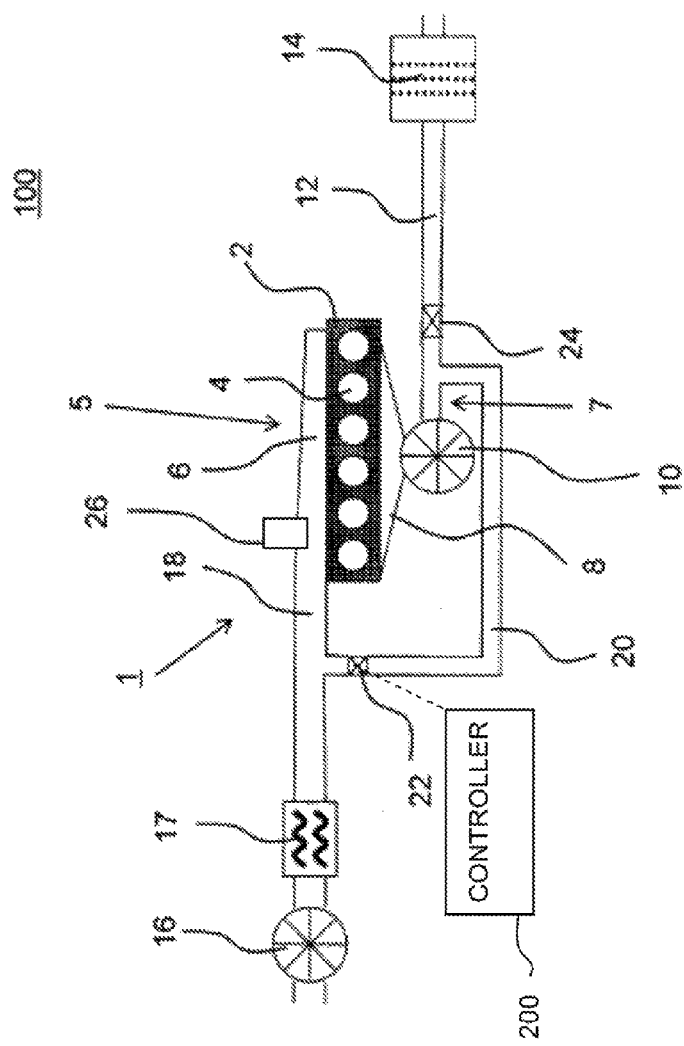
FIG. 1: a schematic illustration of a first preferred embodiment of the inventive system.

In the schematic representation of FIG. 1 an internal combustion engine system 100 is shown which is used in a vehicle (not shown), for example in a truck or bus, or in any other vehicle comprising an internal combustion engine. The engine system 100 comprises an internal combustion engine 1 with an engine block 2 having e.g. six piston cylinders 4. Further, the internal combustion engine 1 has a gas intake side 5 with an intake manifold 6 and an exhaust gas outlet side 7 with an exhaust manifold 8. The exhaust gases are led to a turbine 10 and onward through an exhaust duct 12 to an exhaust gas aftertreatment system 14.

The exhaust gas aftertreatment system 14 can be e.g. a particle trap or a catalyst, as for example an SCR unit (Selective Catalytic Reduction unit). A SCR unit is a means for converting nitrogen oxides by means of a catalyst into nitrogen and water. An optimal temperature range for these reactions is typically between approximately 250° Celsius and approximately 450° Celsius. This optimal operating temperature can be easily kept during normal (driving) operation modes of the engine.

However, during idle or motoring engine operation modes of the engine 1, the temperature of the exhaust gas drops. The reason for that is that air provided by a compressor 16 and cooled by a charge air cooler 17, which re-cools the air after the compression process of the compressor 16, is fed to the intake manifold 6 of the engine block 2 by an induction duct 18, even if combustion is reduced considerably (as in the idle engine operation mode) or no combustion takes place at all (as in the motoring engine operation mode). This in turn means that the engine 1 is simply pumping fresh and cool air into the exhaust duct 12 and onward into the exhaust gas aftertreatment system 14. This cool air causes the exhaust gas aftertreatment system 14 to cool down rapidly below its optimal operating temperature, which in turn results in poor or no exhaust gas purification, so that the required emission levels cannot be achieved.

According to an aspect of the invention, the preferred embodiment shown in FIG. 1 has a connection duct 20 which connects the exhaust gas duct 12 and the induction duct 18. In this embodiment the connection duct 20 is branched off from the exhaust duct 12 downstream of turbine 10.

Figure 2:
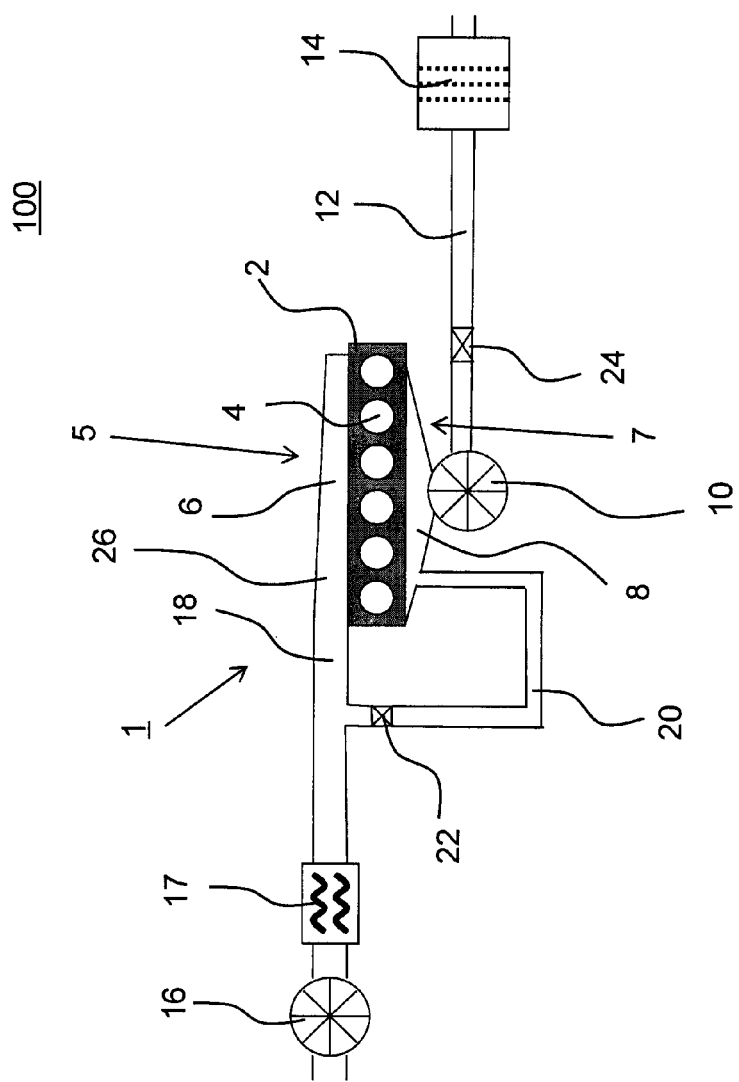
FIG. 2: a schematic illustration of a second preferred embodiment of the inventive system.

However, the connecting duct 20 can also be branched off at the exhaust manifold 8 upstream of turbine 10 as shown in the second preferred embodiment of FIG. 2. Regardless, where the connecting duct 20 is branched off, the operation of both embodiments shown in FIGS. 1 and 2 is the same.

It should be noted that it is also possible that in the internal combustion engine systems 100 shown in FIGS. 1 and 2 the turbine 10 can be omitted.

As can be further seen in FIG. 1 and FIG. 2, a gas recirculation valve 22 is arranged at the connection duct 20, which is preferably a simple on/off valve that is normally closed. Additionally, at the exhaust duct 12 a pressure control valve 24 is arranged, which is normally open and which is adapted to reduce the total exhaust gas stream to the exhaust gas aftertreatment system 14 and propels the exhaust gas recirculation through connecting duct 20.

The reduced total exhaust gas flow through the pressure control valve 24 has two effects. Firstly, the amount of cooling air streaming through the exhaust gas aftertreatment system is reduced. Secondly, the reduced flow rate results in a pressure increase upstream of the pressure control valve 24, which in turn is beneficial for propelling the recirculation of the exhaust gas through the connecting duct 20 to the induction duct 18.

The inventive system as illustrated in the preferred embodiments of FIGS. 1 and 2 operates as follows: as soon as the accelerator pedal of the vehicle (for instance the gas pedal) is released and/or the fuel injection to the engine block 2 stops the gas recirculation valve 22 is controlled by a control 200 to open and the pressure control valve 24 is controlled to at least partly close so that part of the exhaust gas streams through connecting duct 20 into induction duct 18. In contrast to known EGR engine systems, the inventive non-EGR engine does not comprise an exhaust gas cooler in the connecting duct 20, so that hot exhaust gas is fed into induction duct 18.

By feeding hot or uncooled exhaust gas into the induction duct 18 and therefore also into the engine block 2, the air streaming through engine block 2 during idle or motoring engine operation modes is warmed up, which in turn reduces the cooling effect to the exhaust gas aftertreatment system 14.

Additionally, as described above, mainly due to the (at least) partly closed pressure control valve 24, the overall mass flow of exhaust gas to the exhaust gas aftertreatment system 4 is reduced or even (temporarily) stopped, which also decreases the air cooling effect of the exhaust gas aftertreatment system 14 during idle or motoring engine operation modes.

In order to not damage the engine block 2 by exhaust gases which are too hot, a temperature sensor 26 is arranged in the intake manifold 6 of the engine block 2. The temperature sensor 26 also influences the control of the pressure control valve 24 so that the pressure control valve 24 opens more, if the temperature in the intake manifold is above a predetermined temperature range. In this case, the part of the exhaust gas streaming to the exhaust gas aftertreatment system 14 is increased and less amounts of hot exhaust gas is recirculated. This maximum temperature of the engine 1 is typically within a range between substantially 100° Celsius and substantially 150° Celsius, particularly within a range between substantially 110° Celsius and substantially 130° Celsius, preferably approximately around 120° Celsius.

As soon as the temperature control system detects that the gas temperature in the intake manifold 6 exceeds the predetermined maximum temperature, the amount of recirculated exhaust gas is either reduced or the recirculation of the exhaust gas is (temporarily) stopped completely. This can be achieved by increasing the opening degree of the pressure control valve 24 or by opening the pressure control valve 24 completely. Alternatively, the recirculation of the exhaust gas can also be stopped by controlling the gas recirculation valve 22 to close so that only fresh air (provided by the compressor 16) is led through engine block 2. As soon as the temperature at the intake manifold 6 has decreased again and is below said predetermined maximum temperature, the valves 22, 24 may return to their, e.g. previous, exhaust gas recirculation position, provided, of course, the engine 1 is still in the idle or motoring engine operation mode. In cases where a pressure control valve 24 is not provided valve 22 is to be used alone to control the recirculation of the exhaust gas.

As already mentioned in the discussion about the differences between the present invention and usual EGR-engines, a measurement or control of the mass flow of the exhaust gas into the induction duct 18 is not intended to be performed with the inventive method and system. This in turn means that the inventive system is not suited for a controlled NOx reduction as required from, or provided by, usual EGR engines. Moreover, recirculation of exhaust gases is only performed during idle or motoring engine operation modes so that an emission control would not take place during operation modes of the engine other than idle or motoring engine operation modes.

Also in contrast to the known temperature maintenance system, described in document WO 2007/032714, where the temperature in the exhaust gas aftertreatment system is maintained by significantly reducing the exhaust gas flow through the exhaust gas aftertreatment system, the inventive system controls the temperature in the exhaust gas aftertreatment system by inducing warm exhaust gas into the exhaust gas aftertreatment system during idle or motoring engine operation modes (only). Since the known EGR engines comprise an exhaust gas cooler, which is necessary for the NOx reduction provided by the EGR engine, the recirculated exhaust gas of the EGR engine cannot be used for providing a heated exhaust gas during idle or motoring engine operation modes.

An advantage of the inventive system and method is that existing non-EGR engines can be easily equipped or retrofitted with the inventive system. For that in the existing exhaust duct 12 of the engine 1 a connecting duct 20 is mounted as a branch for connecting the existing exhaust duct 12 with the existing induction duct 18. This can be done, e.g. by welding. Additionally, a simple on/off valve 22 is arranged in the connection duct 20, preferably near the outlet to the induction duct 18, and a pressure control valve 24 is arranged in the exhaust gas duct 12 downstream the branching off of the connecting duct 20.

It goes without saying that instead of two separate valves 22, 24 a single valve providing the features of both the air recirculation valve 22 and the features of the pressure control valve 24 may be used.

Both valves can be controlled by a controller, preferably a central processing unit (CPU) or electronic control unit (ECU) already existing in the vehicle, which controls the valves 22, 24 based on the temperature values (sensed by the preferably already existing temperature sensor 26) and the fuel injection. In case such a temperature sensor 26 is not provided, it is easily retrofitted. The controller can be e.g. an onboard computer system to which the valves are connected.

Since the valves are controlled by a controller, the inventive method is preferably stored as software code on a computer program product. This computer program product can also be part of the retrofitting kit.

It should be noted that the rather low number of necessary components and the simplicity of its operation make the inventive system more robust in its operation compared with (rather complex) EGR engines so that the probability that an operation failure occur in the inventive system is much lower, and the engine reliability is much higher, compared with the corresponding values of a typical EGR engine. Additionally, in a preferred embodiment, where the gas recirculation valve 22 is designed as a normally closed valve and/or the pressure control valve 24 is designed as a normally open valve, the engine 1 and the exhaust gas aftertreatment system 14 are still working, even if the control of the valves 22, 24 fails. The engine 1 is only affected in so far that the exhaust gas recirculation during idle or motoring engine operation modes of the vehicle is not working any more.

Advantageously, by using the inventive method and system it is feasible to reach emission levels according to the EURO 6 standard also with non-EGR engines. This can e.g. be shown by running the standard emission test cycles, such as the world harmonized emission level test procedure which comprises two tests: The World Harmonized Transient Cycle (WHTC) test, which is run on cold and hot start conditions, and the World Harmonized Steady-State Cycle (WHSC) test. The WHTC test comprises a transient test of 1800 seconds duration with several motoring engine operation mode segments. Both test cycles are well known and described e.g. by the Commission of the European Community Enterprise Directorate General, in its pamphlet "Heavy duty engine validation of world harmonized duty cycle", which can be downloaded from the internet at http://ec.europa.eu/enterprise/sectors/automotivelfiles/projects/report_whdc_en.pdf.

Figure 3:
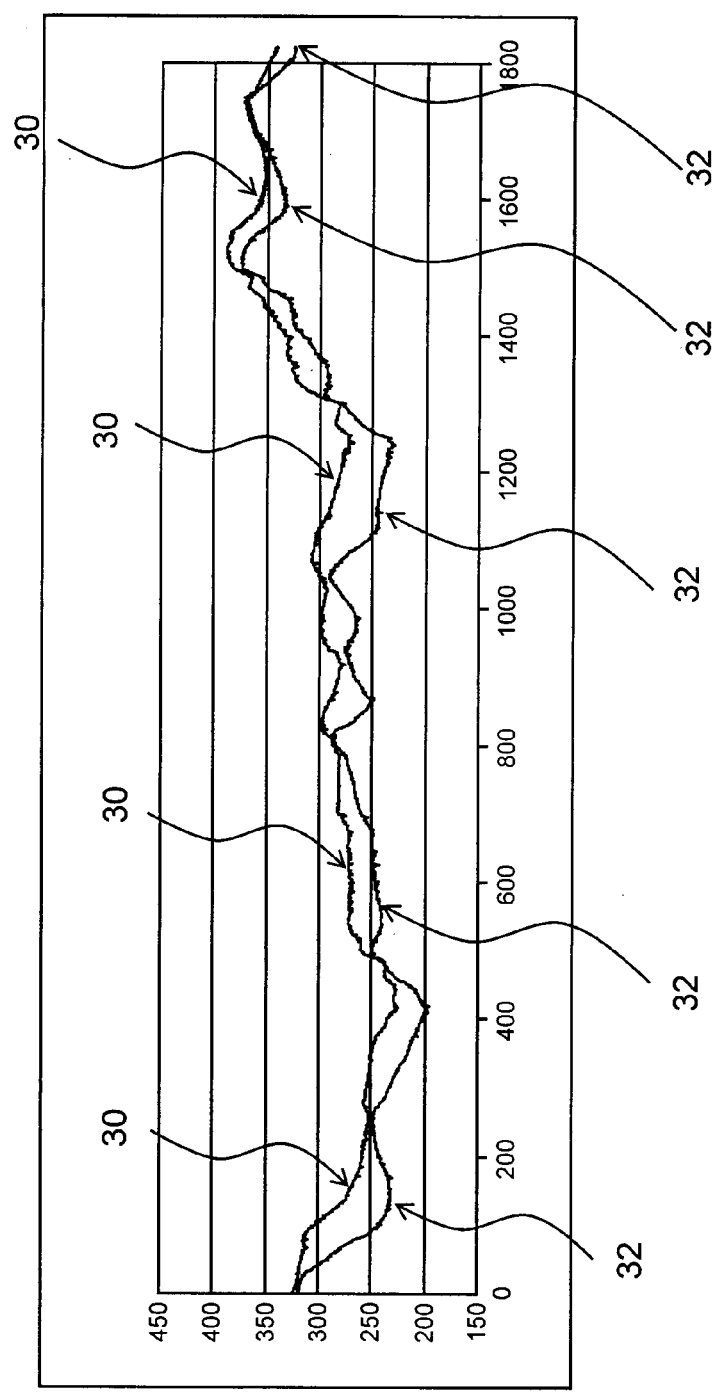
FIG. 3: a diagram showing the temperature the exhaust gas aftertreatment system during an emission level test cycle with and without application of the inventive method.

In FIG. 3, the exhaust gas temperature measurement results during the WHTC test for hot start conditions are illustrated. Thereby two measurements—one according to the inventive method and one according to a standard method—are compared. In FIG. 3, graph 30 shows the WHTC test using the inventive method and graph 32 shows the WHTC test running the engine in the standard way, i.e. without using the inventive method. On the x-axis the time is indicated (in units of seconds) and on the y-axis the temperature of the exhaust gas before the exhaust gas aftertreatment system (here: a SCR system) is indicated (in units of Celsius degrees).

As can be seen from FIG. 3, the temperature differences of the exhaust gases measured for both methods before the SCR unit varies between approximately 10° Celsius and approximately 50° Celsius whereby the temperature values of the standard method (graph 32) are always lower than the temperature values of the inventive method (graph 30) (or equal at best). This measured temperature difference is sufficient for the inventive method to keep the SCR unit on operating temperatures so that, without any additional fuel introduction, emission levels according to EURO 6 standard can be reached even with standard EURO 4 and EURO 5 non-EGR engines.

As described above, the method and system provides a simple, cost-effective and robust possibility to provide a non-EGR engine having EURO 6 properties. This also means that well-established, well-known and proven non-EGR engines can be easily adapted to comply with the EURO 6 standard. Also, an easy retrofitting possibility for EURO 4 and EURO 5 vehicles is provided.

REFERENCE LIST 100 internal combustion engine system
1 internal combustion engine
2 engine block
4 piston cylinder
5 gas intake side of the engine block 2
6 intake manifold
7 exhaust gas outlet side of the engine block 2
8 exhaust manifold
10 turbine
12 exhaust gas duct
14 exhaust gas aftertreatment system
16 compressor
17 charge air cooler
18 induction duct
20 connecting duct
22 gas recirculation valve
4 pressure control valve
6 temperature sensor
30 graph indicating temperature vs time with inventive method
32 graph indicating temperature vs time without inventive method

The invention claimed is:

1. An internal combustion engine system for propelling a vehicle comprising:
an internal combustion engine having a gas intake side and an exhaust gas outlet side,
an exhaust gas aftertreatment system which is connected to the exhaust gas outlet side of the internal combustion engine by means of an exhaust gas duct,
a connection duct connecting the exhaust gas outlet side of the internal combustion engine and the gas intake side of the internal combustion engine, wherein the connection duct is arranged to provide gas recirculation of exhaust gas to the gas intake side of the internal combustion engine,
at least one valve controlling the recirculation of the exhaust gas,
a system for keeping the exhaust gas aftertreatment system within its working temperature range during the idle or motoring engine operation mode of the internal combustion engine, having at least one temperature sensor for sensing a gas temperature and arranged at at least one of; the gas intake side of the internal combustion engine, the exhaust gas outlet side of the internal combustion engine, including an exhaust duct, the connection duct, and the exhaust was aftertreatment system; and
at least one controller arranged to control the at least one valve to open the at least one valve and/or to close the at least one valve depending on the sensed temperature only in case the internal combustion engine is in the idle or motoring engine operation mode, thereby providing an exhaust gas recirculation through the connection duct to the gas intake side of the internal combustion engine only in case the internal combustion engine is determined to be in an idle or motoring engine operation mode, so that the temperature of the gas at the gas intake side of the internal combustion engine is controlled to be within a predetermined temperature range.

2. The internal combustion engine system according to claim 1, wherein the system is arranged to perform a method for keeping the exhaust gas aftertreatment system within its working temperature range during idle or motoring engine operation modes of an internal combustion engine, the method comprising the steps of:
sensing the temperature of a gas at the gas intake side of the internal combustion engine ;
determining whether or not the sensed temperature value is in a predetermined temperature range;
determining whether the internal combustion engine is in an idle or motoring engine operation mode; and
only in case the internal combustion engine is determined to be in an idle or motoring engine operation mode, controlling the temperature of the gas at the gas intake side of the internal combustion engine so that the sensed temperature of the gas at the gas intake side of the internal combustion engine is to be within the predetermined temperature range by recirculating exhaust gas through the connection duct by controlling the at least uric valve.

3. The internal combustion engine system according to claim 1, wherein the at least one valve is a gas recirculation valve which is arranged at the connection duct.

4. The internal combustion engine system according to claim 1, wherein the system further comprises a pressure control valve which is arranged at the exhaust gas duct for controlling anamount of exhaust gas to the exhaust gas aftertreatment system and/or for providing a pressure propelling gas recirculation through the connection duct.

5. The internal combustion engine system according to claim 1, wherein the controller is programmable to perform a method for keeping the exhaust gas aftertreatment system within its working temperature range during idle or motoring engine operation modes of an internal combustion engine, the method comprising the steps of:
sensing the temperature of a gas at the gas intake side of the internal combustion engine and/or of the exhaust gas;
determining whether or not the sensed temperature value is in a predetermined temperature range;
determining whether the internal combustion engine is in an idle or motoring engine operation mode; and
only in case the internal combustion engine is determined to be in an idle or motoring engine operation mode, controlling the temperature of the gas at the gas intake side of the internal combustion engine so that the sensed temperature of the gas at the gas intake side of the internal combustion engine is to be within the predetermined temperature range by recirculating exhaust gas through the connection duct by controlling the at least one valve.

6. Retrofitting kit for retrofitting a vehicle having an internal combustion engine for propelling the vehicle, wherein the vehicle has an already existing exhaust gas aftertreatment system or is to be retrofitted with an exhaust gas aftertreannent system, the kit comprising:
a connecting duct for recirculating exhaust gas from an exhaust gas outlet side of the internal combustion engine to a gas intake side of the internal combustion engine which connecting duct is adapted to connect the exhaust as outlet side of the internal combustion engine to the gas intake side of the internal combustion engine,
at least one valve arrangeable or already arranged at the connecting duct for opening or closing the connecting duct;
a system for keeping the exhaust gas aftertreatment system within its working temperature range during the idle or motoring engine operation mode of the internal combustion engine, comprising
at least one temperature sensor for sensing the gas temperature and arrangeable at least one of: the gas intake side of the internal combustion engine, at exhaust gas outlet side of the internal combustion engine, including an exhaust duct, the connecting duct, and the exhaust gas aftertreatment system; and
at least one controller arranged to control the at least one valve to open the at least one valve and/or to close the at least one valve depending on the sensed temperature only in case the internal combustion engine is in an idle or motoring operation mode, thereby providing an exhaust gas recirculation through the connecting duct to the gas intake side of the internal combustion engine only in case the internal combustion engine is determined to be in an idle or motoring engine operation mode, so that the temperature of the gas at the intake side of the internal combustion engine is controlled to be within a predetermined temperature range.

7. Retrofitting kit according to claim 6, further comprising a pressure control valve for being arranged at the exhaust duct.

8. Retrofitting kit according to claim 6, wherein the at least one controller comprises a computer including a computer program comprising a software code which is enabled to be implemented on the computer, the software code comprising instructions for a processor of the computer to perform the steps of a method for keeping the exhaust gas aftertreatment system within its working temperature range during idle or motoring engine operation modes of an internal combustion engine, the method comprising the steps of:
sensing the temperature of a gas at the gas intake side of the internal combustion engine;
determining whether or not the sensed temperature value is in a predetermined temperature range;
determining whether the internal combustion engine is in an idle or motoring engine operation mode; and
only in case the internal combustion engine is determined to be in an idle or motoring engine operation mode, controlling the temperature of the gas at the gas intake side of the internal combustion engine so that the sensed temperature of the gas at the gas intake side of the internal combustion engine is to he within the predetermined temperature range by recirculating exhaust gas through the connecting duct by controlling the at least one valve.

9. Retrofitting kit according to claim 6, wherein the at least one controller is programmable to perform a method for keeping the exhaust gas aftertreatment system within its working temperature range during idle or motoring engine operation modes of an internal combustion engine, the method comprising the steps of:
sensing the temperature of a as at the gas intake side of the internal combustion engine;
determining whether or not the sensed temperature value is in a predetermined temperature range;

determining whether the internal combustion engine is in an idle or motoring engine operation mode; and only in case the internal combustion engine is determined to be in an idle or motoring engine operation mode, controlling the temperature of the gas at the gas intake side of the internal combustion engine so that the sensed temperature of the gas at the gas intake side of the internal combustion engine is to be within the predetermined temperature range by recirculating exhaust gas through the connecting duct by controlling the at least one valve.

10. Method for keeping an exhaust gas aftertreatment system within its working temperature range during idle or motoring engine operation modes of an internal combustion engine, wherein the internal combustion engine is connected to the exhaust gas aftertreatment system and comprises a gas intake side and an exhaust gas outlet side, wherein the exhaust gas outlet side of the internal combustion engine is connected with the exhaust gas aftertreatment system via an exhaust gas duct and with the gas intake side via a connecting duct, the connecting duct providing a gas recirculation of exhaust gas to the gas intake side of the internal combustion engine, and at least e valve controlling the recirculation of the exhaust gas the method comprising the steps of:

sensing the temperature of gas at the gas intake side of the internal combustion engine;

determining whether or not the sensed temperature value is in a predetermined temperature range;

determining whether the internal combustion engine is in an idle or motoring engine operation mode; and only in case the internal combustion engine is determined to be in an idle or motoring engine operation mode, recirculating exhaust gas through the connecting duct and controlling the temperature of the gas at the gas intake side of the internal, combustion engine so that the sensed temperature of the gas at the gas intake side of the internal combustion engine is to be within the predetermined temperature range by controlling the at least one valve.

11. Method according to claim 10, wherein the at least one valve is a gas recirculation valve which is arranged at the connecting duct, wherein the gas recirculation valve is an on/off valve which is controlled to be either open or closed, wherein the step of controlling the at least one valve comprises the step of controlling the gas recirculation valve to be open.

12. Method according to claim 11, comprising activating the gas recirculation valve as soon as an accelerator of the vehicle is released.

13. Method according to claim 11, wherein the predetermined temperature range has a predetermined maximum temperature, the method comprising closing the recirculation valve lithe sensed temperature is higher than the predetermined maximum temperature.

14. Method according to claim 10, wherein the exhaust gas duct is equipped with a pressure control valve, the method comprising controlling the pressure control valve to at least partly close so that at least part of the exhaust gas is recirculated through the connecting duct to the gas intake side of the internal combustion engine.

15. Method according to claim 14, comprising reducing, by controlling the pressure control valve, the gas flow to the exhaust gas aftertreatment system by 20 percent to 70 percent.

16. Method according to claim 14, comprising reducing, by controlling the pressure control valve, the gas flow to the exhaust gas aftertreatment system in dependence of the engine speed and the sensed temperature of the gas at the gas intake side of the internal combustion engine.

17. Method according to claim 10, wherein the predetermined temperature range has a predetermined maximum temperature.

18. Method according to claim 17, wherein the predetermined maximum temperature is between 100 degrees centigrade and 150 degrees centigrade.

19. Method according to claim 10, comprising controlling the temperature of the gas at the gas intake side of the internal combustion engine to be within the predetermined temperature range by recirculating uncooled exhaust gas.

20. Method for retrofitting a vehicle with a system for keeping an already existing or a to be retrofitted exhaust gas aftertreatment system within its working temperature range during an idle or motoring engine operation mode of an internal combustion engine, wherein the internal combustion engine of the vehicle lacks an exhaust gas recirculation unit, by at least one of installing a retrofitting kit for retrofitting the vehicle having the internal combustion engine for propelling the vehicle, wherein the vehicle has an already existing exhaust gas aftertreatment system or is to be retrofitted with an exhaust gas aftertreatment system, the kit comprising:

a connecting duct for recirculating exhaust gas from an exhaust gas outlet side of the internal combustion engine to a gas intake side of the internal combustion engine which connecting duct is adapted to connect the exhaust gas outlet side of the internal combustion engine to the gas intake side of the internal combustion engine, the exhaust gas outlet side of the internal combustion engine being connected with the exhaust gas aftertreatment system via an exhaust gas duct and with the gas intake side via a connecting duct, the connecting duct providing a gas recirculation of the exhaust gas to the gas intake side of the internal combustion engine, at least one valve arrangeable or already arranged at the connecting duct for opening or closing the connecting duct for controlling the recirculation of the exhaust gas;

a system for keeping the exhaust gas aftertreatment system within its working temperature range during the idle or motoring engine operation mode of the internal combustion engine, comprising at least one temperature sensor for sensing the gas temperature and arranged at the gas intake side of the internal combustion engine; and at least one controller for controlling the at least one valve to open it and/or to close it depending on the sensed temperature in case the internal combustion engine is in an idle or motoring operation mode, thereby providing an exhaust has recirculation through the connecting duct to the gas intake side of the internal combustion engine only in case the internal combustion engine is determined to be in an idle or motoring engine operation mode, so that the temperature of the gas at the intake side of the internal combustion engine is controlled to be within a predetermined temperature range, and keeping the exhaust gas aftertreatment system within its working temperature range during idle or motoring engine operation modes of the internal combustion engine according to a method for keeping the exhaust gas aftertreatment system within its working temperature range comprising:

sensing the temperature of gas at the gas intake side of the internal combustion. engine;

determining whether or not the sensed temperature value is in a predetermined temperature range;

determining whether the internal combustion engine is in an idle or motoring engine operation mode; and only in case the internal combustion engine is determined to be in an idle or motoring engine operation mode, controlling the temperature of the gas at the gas intake side of the internal combustion engine so that the sensed temperature of the gas at the gas intake side of the internal combustion engine is within the predetermined temperature range by recirculating exhaust gas through the connecting duct by controlling the at least one valve.

21. A non-transitory computer program product comprising a software code which is enabled to be implemented on a computer, the software code comprising instructions for as processor of the computer to perform steps of a method for keeping an exhaust gas aftertreatment system within its working temperature range during idle or motoring engine operation modes of an internal combustion engine, wherein the internal combustion engine is connected to the exhaust gas aftertreatment system and comprises a gas intake side and an exhaust gas outlet side, wherein the exhaust gas outlet side of the internal combustion engine is connected with the exhaust gas aftertreatment system via an exhaust gas duct and with the gas intake side via a connecting duct, the connecting duct providing a gas recirculation of the exhaust gas to the gas intake side of the internal combustion engine, and at least one valve controlling the recirculation of the exhaust gas the method comprising the steps of:

sensing the temperature of a gas at the gas intake side of the internal combustion engine;

determining whether or not the sensed temperature value is in a predetermined temperature range;

determining whether the internal combustion engine is in an idle or motoring engine operation mode; and only in case the internal combustion engine is determined to be in an idle or motoring engine operation mode, controlling the temperature of the gas at the gas intake side of the internal combustion engine so that the sensed temperature of the gas at the gas intake side of the internal combustion engine is within the predetermined temperature range by recirculating exhaust gas through the connecting duct by controlling the at least one valve.

* * * * *